United States Patent [19]

Kawano et al.

[11] 4,192,987
[45] Mar. 11, 1980

[54] HIGH FREQUENCY ARC WELDING METHOD AND APPARATUS

[76] Inventors: Hitoshi Kawano; Kiyoshi Ikemura; Mithuhilo Hayashi, all of c/o Shinko Electric Co., Ltd., Ise Factory, 100, Takehanacho, Ise-shi, Mie, Japan

[21] Appl. No.: 835,528

[22] Filed: Sep. 22, 1977

[30] Foreign Application Priority Data

Nov. 1, 1976 [JP] Japan .................. 51/132172

[51] Int. Cl.² .................................................. B23K 9/10
[52] U.S. Cl. .......................... 219/137 PS; 219/130.51
[58] Field of Search ............ 219/130.4, 130.51, 137 PS

[56] References Cited

U.S. PATENT DOCUMENTS

| | | | |
|---|---|---|---|
| 3,444,430 | 5/1969 | Needham | 219/130.4 |
| 3,728,515 | 4/1973 | Gedgaudas | 219/130.51 |
| 3,894,210 | 7/1975 | Smith et al. | 219/130.51 |
| 3,902,037 | 8/1975 | Goto et al. | 219/130.51 |
| 3,999,034 | 12/1976 | Barhost | 219/130.51 |
| 4,009,365 | 2/1977 | Kaley et al. | 219/130.51 |
| 4,046,987 | 9/1977 | Hashimoto et al. | 219/130.51 |

FOREIGN PATENT DOCUMENTS

| | | | |
|---|---|---|---|
| 50-29449 | 3/1975 | Japan. | |
| 1199855 | 7/1970 | United Kingdom | 219/130.51 |
| 390900 | 12/1973 | U.S.S.R. | 219/130.51 |
| 408726 | 8/1974 | U.S.S.R. | 219/130.51 |

Primary Examiner—Bruce A. Reynolds
Assistant Examiner—Clifford C. Shaw
Attorney, Agent, or Firm—Michael J. Striker

[57] ABSTRACT

A high frequency arc welding apparatus is provided with one D.C. electrical source used for welding purpose and the other D.C. electrical source used for regeneration purpose. One variable impedance element is connected in circuit with the one D.C. electrical source and the other variable impedance element is connected in circuit with the other D.C. electrical source. Electrical energy stored by means of the one variable impedance element temporarily in one inductance provided inevitably in circuit with the one D.C. electrical source is regenerated in the other D.C. electrical source and is discharged in the other inductance provided in circuit with the other D.C. electrical source, by means of the other variable impedance element to be regenerated in the one D.C. electrical source.

7 Claims, 11 Drawing Figures

HIGH FREQUENCY ARC WELDING METHOD AND APPARATUS

BACKGROUND OF THE INVENTION

This invention relates to a high frequency arc welding method and apparatus and, more particularly, to a high frequency arc welding method and apparatus in which a D.C. electrical source used for welding purpose and either another D.C. electrical source or an equivalent capacitor, used for regenerative purpose of the electrical energy stored in the inductance of the arc welding apparatus and inevitable cable inductance are provided and the stored electical energy is regenerated in the D.C. electrical source used for welding by adjusting properly the voltage of the another D.C. electrical source or the equivalent capacitor, for regenerative purpose.

It is well known that when high frequency pulse component of 10 KHz to 100 KHz is involved in the welding current of a D.C. arc welding apparatus, the superiority in the stiffness and the stability of the arc to those without having high frequency pulse component is remarkable, irrespective of non-consumptive electrode type and consumptive electrode type, therefore the welding speed can be accelerated extremely, moreover the pulsing welding current makes beads neat and improve welding characteristics metallurgically. It is noted that the relationship between the high frequency arc current and the welding effectiveness is stated as (1) the higher the frequency of the high frequency pulse current the better the welding characteristics and also (2) the larger the ripple component involved in the high frequency pulse current the better the welding characteristics, with the mean value of the high frequency arc welding current kept the same.

Prior art of the high frequency arc welding apparatus is shown in FIGS. 1 to 4, in which FIGS. 1 and 3 are circuit diagrams of the prior art and FIGS. 2 and 4 show the waveforms of the welding current obtained in the circuit diagrams given in FIGS. 1 and 3.

In FIGS. 1 and 2, when a switch SW is closed, welding current i flows from a D.C. electrical source E through the switch SW, an inductance L of the welding machine and torch cable and a resistnace R which is equivalent to the arc load of the welding machine to the D.C. electrical source E in FIG. 1 and the welding current i leads up from a point 0 to reach a value at a time t1 through a time t0 in FIG. 2. After an on-duty duration of the switch SW elapses which is necessary to maintain the welding current at a mean value which is previously set, the switch SW is opened at the time t1. Then the welding current i flows in a circuit consisting of the inevitable inductance L, the arc resistance R and a diode D in FIG. 1 and the welding current i trails down from a value at the time t1 to a value at a time t2 to attenuate with a time-constant L/R. At the time t2 when a duration T0 elapses, which is determined by the frequency of the high frequency pulse current which is previously set, the switch SW is again closed and thereafter the open and close cyclic operation of the switch SW is repeated. Thus the welding is performed according to the waveforms of the welding current shown in FIG. 2.

Under these conditions, when the time-constant L/R of the attenuation is large, it requires a long time duration for the welding current to attenuate completely, so the ripple component of the welding current is made less, as shown in the waveforms of FIG. 2. Accordingly, a defect is noticed in this welding current in that said better welding effects with high frequency and large ripple component cannot be obtained, even if the loss is kept less.

In the circuit shown in FIG. 3, a resistance R0 is inserted in the circuit in which the welding current attenuates in order to improve the characteristics given in the circuit shown in FIG. 1. According to the circuit shown in FIG. 3, the time-constant of the attenuation will be denoted as $L/R+R0$ which is less than that given in the circuit shown in FIG. 1 and also the ripple component of the welding current is made larger, as shown in FIG. 4, than that shown in the waveforms of FIG. 2. Thus, an advantage is obtained in which a better welding effect is expected due to the larger ripple component. However, another defect is noticed to be fatal to the welding operation in this circuit in that the operational efficiency is deteriorated through a huge energy consumption due to the inserted resistance R0. When the pulsing frequency of welding current is 25 KHz and the peak value of welding current is 1,000 A and the inevitable inductance L is 5 $\mu$H, the energy consumption of R0 exceeds 60 KW in the case of FIG. 4.

SUMMARY OF THE INVENTION

The electric welding is performed by using high frequency welding current of triangular waveforms by means of the operation of a switching element SW1 used for the actual welding purpose, at a high frequency. The electrical energy of an inductance L1 of an welding machine and torch cables is temporarily stored in either a D.C. electrical source E2 or an equivalent capacitor C2, used for the regenerative purpose. The stored electical energy is then regenerated in a D.C. electrical source E1 used for the welding purpose by means of the operation of a switching element SW2 used for the regenerative purpose through an inductance L2 used for the regenerative purpose. At the same time the voltage of either the D.C. electrical source E2 or the equivalent capacitor is properly adjusted to accomodate it with the cycle and duty of operation of the switching element SW1 so that the welding operation is performed with the mean value and the peak value of the welding current propotional to the mean value being kept constant or adjusted irrespective of the pulsing frequency.

Accordingly, no loss in the electrical power which is consumed in the inserted resistance is brought about in the invention of subject application as experienced in the prior art and the ripples in the waveforms of the welding current are not degraded. Therefore, a better welding effect can be expected in this invention.

Furthermore, the welding frequency can be varied with maintaining the peak value of the welding current constant under a fixed mean value of the welding current, so that cost for installing the welding apparatus is prevented from being increased due to anginentation of the electrical current capacity of the switching element and of the operating voltage of the whole welding circuit. Therefore, the welding effect is further improved.

In addition to these advantages, when the inductance L2 is made larger than the inevitable inductance L1, the operating frequency of the switching element SW2 can be made lower than the operating frequency of the switching element SW1, irrespective of the actual value of the operating frequency of the switching element SW1 to an extent such as about 400 Hz or less. When the maximum operating frequency of the switching element SW2 is set at about 400 Hz or less, a thyristor can be utilized as the switching element SW2.

Thus, the cost for installing the welding apparatus can further be decreased than that of the prior art in which two or more switching elements for high frequency are utilized for performing the welding operation. Moreover, the voltage appearing at the time when the switches make contact and the switching powder loss proportional to switching frequency are decreased to the effect that the efficiency of the whole welding apparatus can be ameliorated.

DESCRIPTION OF THE PREFERRED EMBODIMENTS

Figure 1:
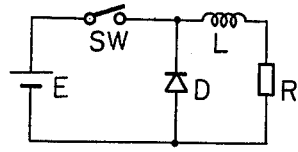
FIG. 1 is the circuit diagram of a high frequency arc welding apparatus of the prior art.
Figure 2:
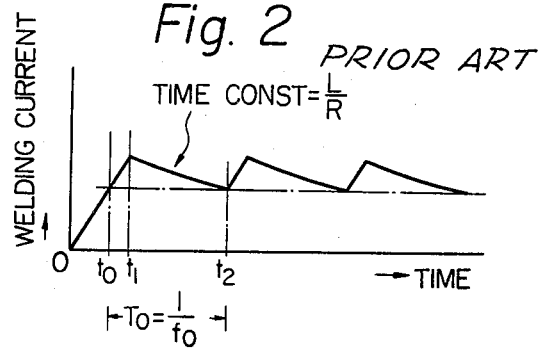
FIG. 2 shows the waveforms of the welding current obtained in the circuit diagram given FIG. 1.
Figure 3:
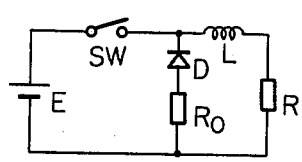
FIG. 3 is the circuit diagram of another high frequency arc welding apparatus of the prior art.
Figure 4:
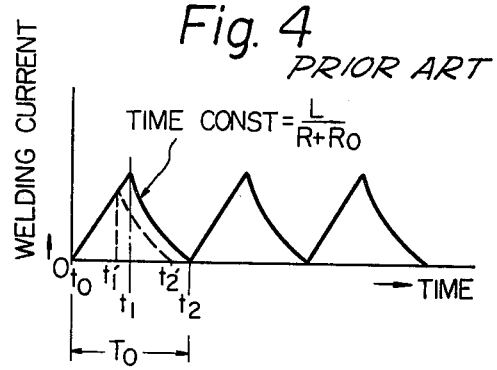
FIG. 4 shows the waveforms of the welding current obtained in the circuit diagram given in FIG. 3.
Figure 5:
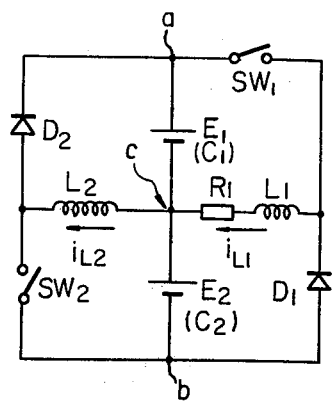
FIG. 5 is the fundamental circuit diagram of an embodiment of the high frequency arc welding apparatus provided in accordance with the invention of subject application.

In the fundamental circuit diagram of the invention of subject application given in FIG. 5, a variable impedance element such as a switching element SW1 is connected in series with a D.C. electrical source E1, a resistance R1 which is equivalent to the arc load of a welding machine and an inevitable inductance L1 of the welding machine and torch cable. The resistance R1 and the inevitable inductance L1 are also connected in series conceptionally with a rectifier such as a diode D1 and another D.C. electrical source E2. The D.C. electrical source E2 is also connected in series with an inductance L2 provided for regenerative purpose and a variable impedance element such as a switching element SW2. A rectifier such as a diode D2 is connected in series with the D.C. electrical source E1 and the inductance L2. The D.C. electrical source E1 is used for welding purpose and the D.C. electrical source E2 is used for regenerative purpose.

In the circuit, it is assumed that the D.C. electrical source E2 may be replaced by an equivalent capacitor C2, the D.C. electrical sources E1 and E2 may assume the same voltage e0 and are provided with capacitors in parallel thereto which are large enough to be considered as D.C. power sources by rectifying the full waves of an alternating current source and the arc voltage drop is small enough compared with the voltage e0 of the D.C. electrical sources.

The operation of the circuit is explained with reference to FIG. 6 as follows:

When the switching element SW1 is closed at a time t0 with the switching element SW2 still opened, a closed circuit is established between the D.C. electrical source E1, the switching element SW1, inevitable inductance L1, the resistance R1 and the D.C. electrical source E1. Accordingly, a welding current $i_{L1}$ will flow in the closed circuit and increase with an inclination defined by a factor $e_0/L_1$ from the time t0 to a time t1, as shown in FIG. 5. The switching element SW1 is opened at the time t1 which corresponds to the end point of a closing duration TA0 in which the switching element SW1 is closed for one full period of a duration wherein the average of the welding current $i_{L1}$ becomes a predetermined mean value i0 of the welding current. Then, another closed circuit is established between the inevitable inductance L1, the resistance R1, the D.C. electrical source E2, a diode D1 and the inevitable inductance L1 and the welding current $i_{L1}$ will decrease with an inclination defined by a factor $-e_0/L_1$ from the time t1 to a time t2 in a opening duration TB0, as shown in FIG. 6. The switching element SW1 is again closed at the time t2 after the duration T0 elapsed which corresponds to the time duration of the sum of the duration TA0 and the duration TB0, from the time t0 to the time t2 and the welding is performed with a welding current of triangular waveforms.

It is defined that under these conditions the welding apparatus is at the maximum working frequency f0 which corresponds to a factor 1/T0 and at the maximum average welding current i0=ip0/2.

Figure 6:
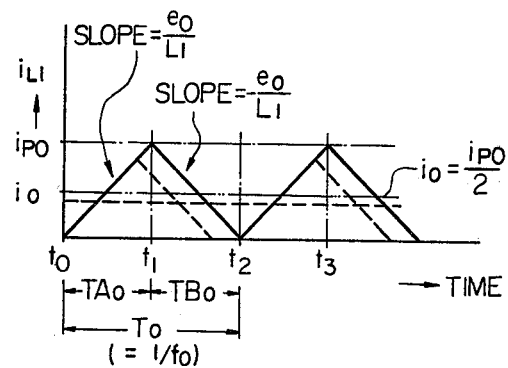
FIG. 6 shows the waveforms of the welding current fundamentally obtained in the circuit diagram given in FIG. 5.

In order to lower the mean value of the welding current, it can generally be sufficient to shorten the closing duration of the switching element SW1 to make the welding current lower, as shown by the broken line in FIG. 6. In FIG. 6, it is taught that when the welding apparatus is at the maximum frequency and at the maximum average current, the mean value i0 indicated by a double dotted line of the welding current is one half of the maximum value ip0, i.e. i0=ip0/2, the duration T0, which corresponds to a factor 1/f0, is a sum of a duration TA0 which corresponds to the time duration from the time t0 to the time t1 and a duration TB0 which corresponds to the time duration from the time t1 to the time t2, i.e. T0=TA0+TB0, which is achieved only when the apparatus is at full rating, and the duration TA0 equalls to the duration TB0, i.e. TA0=TB0, since the absolute value of the inclination of the ascending waveforms is the same as the absolute value of the inclination of the descending waveforms.

Figure 7:
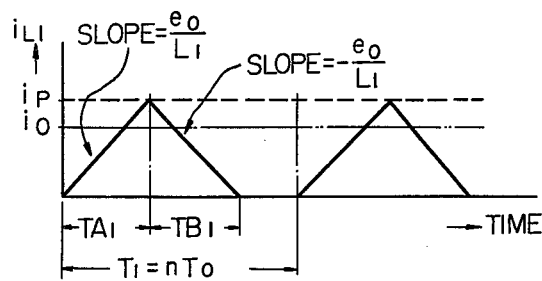
FIG. 7 shows the waveforms of the welding current obtained in the circuit diagram given in FIG. 5, provided that the voltage of the D.C. electrical source used for regeneration purpose is made the same as the voltage of the D.C. electrical source used for welding current is varied.

An operation of the circuit shown in FIG. 5, in which the working frequency of the welding current is lowered, is explained with reference to the waveforms shown in FIG. 7. In FIG. 7, it is assumed that the welding is performed at a lower working frequency f1=f0/n, in which n>1. Under this condition, a duration T1 becomes a duration nT0, i.e. T1=nT0 and that the closing duration and the opening duration of the switching element SW1 are, respectively, denoted as TA1 and TB1 and the peak value of the welding current when the frequency is lowered is denoted as ip as shown by the broken line in FIG. 7, the following equations are obtained:

$$TA1 = ip/ip0 \; TA0$$

$$TB1 = ip/ip0 \; TB0$$

$$\therefore TA1+TB1 = ip/ip0(TA0+TB0) = ip/ip0 \; T0$$

In order to satisfy the condition i0=ip0/2, as noted above, the peak value ip of the welding current, when the frequency is lowered, is obtained from the following calculation:

$$i0 = ip0/2 = (TA1+TB1)/T1 \times ip \times \tfrac{1}{2} = ip/ip0 \\ T0 \times (1/nT0) \times ip \times \tfrac{1}{2}$$

$$ip0 = (ip)^2/ip \times (1/n)$$

$$\therefore n(ip0)^2 = (ip)^2 ip = \sqrt{n} \, ip0$$

This means that when the working frequency becomes 1/n times as low as the maximum working frequency f0, the peak value ip of the welding current, when the frequency is lowered, should be √n times as high as the peak value ip0 of the initial welding current and the switching capacity of the switching element SW1 must be increased in order that the mean value of the welding current, when the frequency is lowered, is made to coincide with the mean value of the initial welding current. This is not absolutely economical and it is not desirable in view of the efficiency.

In order to solve this defect, in the improved embodiment of the invention of subject application, an ability for maintaining the output of the mean value of the welding current iL1 invariable is supplemented while the peak value of the welding current is kept substantially constant even under a condition that the working frequency is lowered, by making the regenerative voltage of the D.C. electrical source E2 adjustable. More particularly, the regenerative voltage is adjusted as shown in the waveforms in FIG. 8 to obtain the same peak value and the same mean value of the welding current as those given by a single dotted line and a double dotted line in FIG. 6.

Figure 8:
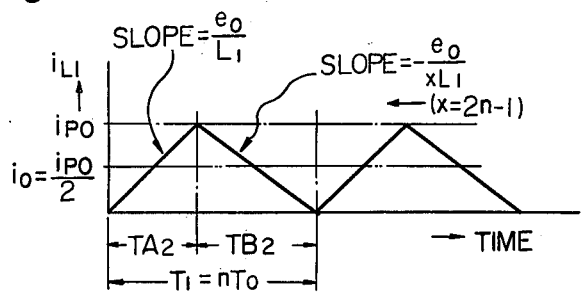
FIG. 8 shows the waveforms of the welding current obtained in the circuit diagram given in FIG. 5, provided that the peak value and the mean value of the welding current are kept constant by adjusting the regenerative voltage in accordance with the prime principle of the invention of subject application, and FIG. 9 (A), FIG. 9 (B), FIG. 9 (C) explain the operational waveforms of the regenerative current and voltage.

In FIG. 8, the regenerative voltage of the D.C. electrical source E2 is obtained under a condition that the working frequency f2 is made equal to 1/n times as low as the maximum working frequency f0, i.e. f2=f0/n, in the following equations:

It is considered that a sum of a duration TA2 and a duration TB2 equals to the duration T1, i.e. TA2+TB2=T1, which is also equals to nT0, i.e. T1=nT0 and the duration TA2 equals to the duration TA0, i.e. TA2=TA0 and, therefore, the duration TB2 is a substraction of the duration TA2 or the duration TA0 from the duration T1 or the duration nT0, i.e. TB2=nT0−TA0. As the duration TA0 equals to the duration TB0 as stated with reference to FIG. 6, it follows that:

$$TB2 = nT0 - TA0 = n(TA0 + TB0) - TA0 \\ = 2nTB0 - TB0 = (2n - 1)TB0$$

As the duration TB2 is inversely proportional to the regenerative voltage Vc of the D.C. electrical source E2, the following equation is obtained:

$$(TB2/TB0) = e0/Vc$$

$$\therefore Vc = (TB0/TB2)e0 = (e0/2n-1)$$

Accordingly, if the regenerative voltage Vc of the D.C. electrical source E2 is made equal to (e0/2n−1), when the welding apparatus is working at a working frequency f2 which equals to f0/n, the mean value and the peak value of the welding current, as shown in the waveforms in FIG. 8, can be kept the same as the mean value and the peak value of the initial welding current, as shown in the waveforms in FIG. 6, in other words the current i0 and ip0 are kept constant.

In the present example, it is noted that the substantial upper limit of the frequency range used actually is realized at an order of 25 KHz under a condition that the voltage of the D.C. electrical source E1 is of an order of 250 V, the inevitalbe inductance L1 of the wiring of the welding machine is of an order of 5 μH and the mean value i0 of the welding current is, at the maximum, of 500 A. Frequencies exceeding 15 KHz are frequently used in considering the noise problem. Then, the frequency range to be used actually is preferably considered to cover a range of 1:2 at least. This means that the regenerative voltage of the D.C. electrical source E2 may be adjusted in a range of 1:3 in compliance with the variation in the working frequency. As stated above, an equivalent capacitor C2 to be considered as an electrical source as well as a D.C. electrical source E2, may be utilized as the source for regeneration. When a capacitor is utilized, the capacitor may be charged to the voltage e0 which is the same as the voltage of the D.C. electrical source E1, at the initial closing of the switching element SW1.

In this connection, a circuit is required for discharging the electrical energy regenerated in the source of the regenerative voltage of the D.C. electrical source E2 or the equivalent capacitor C2 by the electrical energy coming from the D.C. electrical source E1, since the regenerative voltage increases gradually every time when the switching element SW1 closes and opens. The circuit for discharging the electrical energy is established in FIG. 5 from the D.C. electrical source E2 through the inductance L2 and the switching element SW2 to the D.C. electrical source E2. More particularly, the electrical energy stored in the inevitable inductance L1 is regenerated in the D.C. electrical source E2 or the equivalent capacitor C2 by opening the switching element SW1 and the electrical energy regenerated is discharged as regenerative current iL2 flowing in the circuit for discharging by closing the switching element SW2. The electrical energy stored in the inevitable inductance L1 and regenerated in the D.C. electrical source E2 or the equivalent capacitor C2 is temporarily stored in the inductance L2 and the electrical energy stored in the inductance L2 is regenerated in the D.C. electrical source E1 at the time when the switching element SW2 is opened through a circuit established in FIG. 5 from the inductance L2 through the diode D2 and the D.C. electrical source E1 to the inductance L2.

Figure 9:
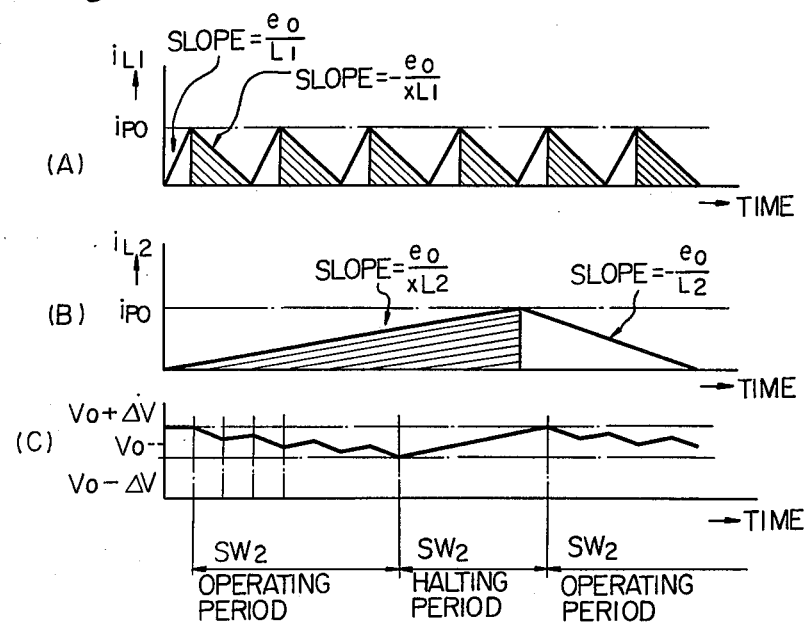

The waveforms of the regenerative operation are explained with reference to FIG. 9 (A), FIG. 9 (B) and FIG. 9 (C), in which FIG. 9 (A) shows the waveforms of the welding current iL1 and FIG. 9 (B) shows the regenerative current iL2 and the time and the peak value of the welding current in these two figures are indicated as having the same scale. The parts hatched in FIG. 9 (A) denote the quantity of electric energy flowing into the D.C. electrical source E2 or the equivalent capacitor C2 and the parts hatched in FIG. 9 (B) denote the quantity of electric energy flowing out of the D.C. electrical source E2 or the equivalent capacitor C2, every time when the switching element SW2 is operated. In these two figures, if it is assumed that the peak value of the welding current iL1 is the same as the peak value of the regenerative current iL2 and they are of the peak value of the initial welding current ip0, the quantity of electric energy flowing into the D.C. electrical source E2 or the equivalent capacitor C2 is equal to the quantity of electricity flowing out of the D.C. electrical source E2 or the equivalent capacitor C2, since the area hatched in these two figures are of the same value within a same value within a same time interval. However, the quantity of electric energy flowing into is actually less than the quantity of electric energy flowing out of, because an arcing resistance and the diode D1 are practically inserted in series with the circuit. Accordingly, if the current of the switching element SW2 assumes the same value as the current of the switching element SW1, the electrical energy in the D.C. electrical source E2 or the equivalent capacitor C2 can be made to be fully flown out by the operation of the switching element SW2.

The variation in the waveforms of the D.C. electrical source E2 or the equivalent capacitor C2 is explained with reference to FIG. 9 (C). It is assumed that the voltage Vc of the D.C. electrical source E2 or the equivalent capacitor C2 is determined by the frequency of the welding current which is previously set and the reference voltage of the voltage Vc is defined as a voltage V0. Then an upper limit voltage $V0+\Delta V$ and a lower limit voltage $V0-\Delta V$ can respectively be determined without causing any bad effect to the welding characteristics, where the voltage $\Delta V$ is defined as a difference from the voltage V0. When a device, not shown in the figure, detects the instant when the voltage Vc exceeds upward the upper limit voltage $V0+\Delta V$, the switching element SW2 operates to open and close the circuit and the variation in the voltage Vc is shown in the "SW2 operating period" of FIG. 9 (C). It is noted that the time scale used in FIG. 9 (A) and FIG. 9 (B) is not the same as that used in FIG. 9 (C).

More particularly, if the switching element SW2 is closed the voltage Vc decreases as the electrical energy in the D.C. electrical source E2 or the equivalent capacitor C2 flows out and if the switching element SW2 is opened the voltage Vc increases. When the decrement of the voltage Vc is assumed to be larger than the increment of voltage Vc, the voltage Vc decreases gradually as a whole to reach the lower limit voltage $V0-\Delta V$. The instant when the voltage Vc exceeds downward the lower limit voltage $V0-\Delta V$ is then detected by the device to halt the open and close operation of the switching element SW2 at the open position of the switching element SW2. Then, the quantity of electric energy is made only to flow into the D.C. electrical source E2 to increase the voltage Vc as shown in the "SW2 halting period" of FIG. 9 (C), until the voltage Vc reaches the upper limit voltage $V0+\Delta V$. At the instant when the voltage Vc exceeds upward the upper limit voltage, the switching element SW2 is again operated to decrease the voltage Vc by opening and closing the switching element SW2. A repeated automatic operation of the switching element SW2 is thus performed to maintain the voltage Vc within the range previously defined by the upper limit voltage and the lower limit voltage.

The frequency for operating the switching element SW2 may be made the same as the frequency for operating the switching element SW1 and, alternatively, it is possible to make the frequency for operating the switching element SW2 low by making the inductance L2 large.

In the foregoing explanation, the D.C. electrical source E1 is considered as the welding electrical source and the D.C. electrical source E2 or the equivalent capacitor C2 is considered as the regenerative electrical source. However, as another embodiment of the invention of subject application, the D.C. electrical source E1 or an equivalent capacitor C1 may be used as the regenerative electrical source and the D.C. electrical source E2 may be used as the welding electrical source, wherein the ascending slope of the welding current is regulated. In this case, the efficiency of the welding apparatus is extremely deteriorated in comparison with that obtained in the regular arrangement and it results in that obtaining a steep increment of the welding current is rather difficult. Thus, it will be noticed that the regular arrangement is considered proper.

As stated above, according to the invention of subject application, superior effectiveness to the prior art can be brought about in that the welding effect and efficiency of a high frequency arc welding apparatus is remarkably improved and, at the same time, the cost for providing the welding apparatus can substantially be diminished.

We claim:

1. A high-frequency arc welding method comprising the steps of
    applying a voltage from a D.C. electrical source E1 of an arc welding machine across an electrode of the machine and a workpiece to establish an arc welding current between the electrode and workpiece;
    intermittently disconnecting the electrical source E1 thereby effecting temporary storage of magnetic energy in the inevitable inductance L1 inherent in the arc welding machine and its torch cable;
    transferring the temporarily stored magnetic energy from the inevitable inductance L1 to a second D.C. electrical source E2 in the form of electrical energy to effect temporary storage of the transferred energy in the second source E2;
    discharging the electrical energy temporarily stored in the second source E2 into an inductance L2 to effect temporary storage of the discharged electrical energy in inductance L2 in the form of magnetic energy; and
    effecting conversion of the magnetic energy temporarily stored in inductance L2 into electrical energy and regenerative transfer of the thusly converted energy back into the first D.C. electrical source E1.

2. A method as defined in claim 1, using for the first and second D.C. electrical sources E1 and E2 two voltage sources connected together in series with such a polarity that the voltages across them add.

3. In a high-frequency arc welding machine, an operating circuit which comprises, in combination,
    a first circuit comprising a first D.C. electrical source E1, first controllable impedance means SW1, an inductance L1 representing the inevitable inductance inherent to an arc welding machine and its torch cable and a resistance R1 representing the arc-current load of the welding machine;

a second circuit comprising a second D.C. electrical source E2, said resistance R1, said inductance L1, and a first rectifier D1 of polarity opposite to that of said second source E2;

a third circuit comprising said second source E2, second controllable impedance means SW2, and a second inductance L2;

a fourth circuit comprising said first source E1, said second inductance L2 and a second rectifier D2 having a polarity the same as first source E1, said first controllable impedance means SW1 alternating at high frequency between a low and a high impedance value, said first impedance means SW1 when at low impedance value causing the first source E1 to establish a flow of arc welding current through said inevitable inductance L1 and said arc-current load resistance R1 and simultaneously causing a build-up of stored magnetic energy in inductance L1, said first impedance means SW1 when at the high impedance value effectively disconnecting the first source E1 and causing the magnetic energy stored in inductance L1 to be dissipated as a current flowing through the second circuit in the direction permitted by said first rectifier D1 and thereby effecting a transfer of the stored magnetic energy in the form of electrical energy into said second source E2, said second controllable impedance means SW2 alternating between a low and a high impedance value, said second impedance means SW2 when at low impedance value effecting a discharge of the electrical energy stored in said second source E2 through said second inductance L2 and thereby a build-up of stored magnetic energy in said second inductance L2, said second impedance means SW2 when at high impedance value effectively opening said third circuit and thereby causing the magnetic energy stored in said second inductance L2 to be dissipated as a current flowing through said fourth circuit in the direction permitted by said second rectifier D2 and thereby effecting a regenerative transfer of the magnetic energy stored in said second inductance L2 in the form of electrical energy into said first source E1.

4. A high frequency arc welding machine specified in claim 3, wherein said variable impedance elements SW1 and SW2 are switching elements and said rectifiers D1 and D2 are diodes.

5. A high-frequency arc welding machine as defined in claim 3, the more negative terminal of the first source E1 being connected to the more positive terminal of the second source E2.

6. A high-frequency arc welding machine as defined in claim 3, the frequencies at which said first and second controllable impedance means SW1 and SW2 alternate between high and low impedance values being adjustable.

7. A high-frequency arc welding machine as defined in claim 3, the first controllable impedance means SW1 alternating between high and low impedance values with a frequency between about 10 KHz and about 100 KHz, the second controllable impedance means SW2 alternating between high and low impedance values with a frequency on the order of 400 Hz.

* * * * *